(12) United States Patent
Edwards et al.

(10) Patent No.: US 7,298,437 B2
(45) Date of Patent: Nov. 20, 2007

(54) MATRIX DISPLAY DEVICES

(75) Inventors: Martin John Edwards, Sussex (GB); John Richard Alan Ayres, Reigate (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 83 days.

(21) Appl. No.: 10/506,156

(22) PCT Filed: Feb. 6, 2003

(86) PCT No.: PCT/IB03/00442

§ 371 (c)(1),
(2), (4) Date: Aug. 30, 2004

(87) PCT Pub. No.: WO03/077021

PCT Pub. Date: Sep. 18, 2003

(65) Prior Publication Data

US 2005/0088589 A1 Apr. 28, 2005

(30) Foreign Application Priority Data

Mar. 8, 2002 (GB) .................. 0205479.9

(51) Int. Cl.
*G02F 1/1333* (2006.01)
(52) U.S. Cl. ......................... 349/111; 349/59
(58) Field of Classification Search ................ 349/111, 349/59
See application file for complete search history.

(56) References Cited

U.S. PATENT DOCUMENTS

| | | | | |
|---|---|---|---|---|
| 3,921,162 A * | 11/1975 | Fukai et al. | ................. | 345/101 |
| 4,630,122 A * | 12/1986 | Morokawa | .................. | 348/792 |
| 5,317,436 A * | 5/1994 | Spitzer et al. | ................. | 349/5 |
| 5,353,135 A * | 10/1994 | Edwards | ...................... | 349/34 |
| 5,745,087 A * | 4/1998 | Tomiyoshi et al. | ........... | 345/89 |
| 5,757,445 A * | 5/1998 | Vu et al. | ....................... | 349/45 |
| 6,055,034 A * | 4/2000 | Zhang et al. | ................ | 349/151 |
| 6,069,677 A * | 5/2000 | Kitai | ........................... | 349/111 |
| 6,590,229 B1* | 7/2003 | Yamazaki et al. | ............ | 257/71 |
| 6,888,528 B2* | 5/2005 | Rai et al. | ..................... | 345/102 |
| 2002/0101553 A1 | 8/2002 | Enomoto et al. | | |

* cited by examiner

*Primary Examiner*—Michael H. Caley

(57) ABSTRACT

A matrix display device, for example an AMLCD, has first and second spaced substrates (22, 23) carrying opposed display pixel electrode structures (14, 32, 38) defining a pixel array/display area (20) with the first substrate (22) further carrying outside the display area auxiliary circuitry, for example, comprising row and column drive circuits (40, 42) a signal processing circuit (45) a memory circuit (47), or control logic circuit (46). At least a part of the auxiliary circuitry is electrical shielded to prevent electrical interference problems by an electrically conductive shielding layer (s) (60) carried on a part (50) of the first substrate (23) that extends over the auxiliary circuitry. The shielding layer may conveniently comprise part of an electrode layer (32) deposited on the second substrate and used for the pixel electrode structure.

20 Claims, 2 Drawing Sheets

MATRIX DISPLAY DEVICES

The present invention relates to a matrix display device comprising electro-optic material disposed between first and second spaced substrates, the first substrate carrying a pixel circuit comprising an array of pixel electrodes defining display pixels in a display area and auxiliary electronic circuitry at a region of the first substrate outside the display area.

An example of such a display device is an active matrix liquid crystal display device (AMLCD). As is well known, these devices comprise a layer of liquid crystal material sandwiched between a pair of spaced substrates which are sealed together to contain the liquid crystal material and carry electrodes that define individual display pixels in a row and column array. One of the substrates, commonly referred to as the active substrate or plate, carries an array of pixel electrodes each of which is associated with a switching device, typically a thin film transistor (TFT), provided on the substrate adjacent to the pixel electrode. The substrate also carries sets of row and column address conductors connected to the TFTs to enable addressing of the pixels. The other substrate, commonly referred to as the passive substrate or plate, carries an electrode structure constituting the display pixel second electrodes, and usually provided as a single conductive layer forming a common electrode extending over the array of pixel electrodes in the display area. The passive substrate typically also carries an array of colour filter elements, each associated with, and overlying, a respective pixel electrode on the active substrate, and a black matrix, light shielding layer comprising a grid of optically opaque material extending between the individual colour filter elements of the display pixels.

Commonly, drive circuits for driving the display pixels are provided in the form of ICs mounted on the active substrate peripherally of the display pixel array whose outputs are connected to the sets of address conductors. It is known also to integrate the drive circuits on the active substrate as thin film electronic circuits comprising circuit elements such as switching devices and connection lines fabricated simultaneously with the switching devices (TFTs) and address conductors in the pixel array from common deposited layers. Such integration avoids the need to provide separately fabricated drive circuits and to connect these with the sets of address conductors. Both the row (scanning) drive circuit for selecting rows of display pixels and the column (data) drive circuit for supplying display data signals to the pixels to obtain a desired display output from individual display pixels can readily be integrated using conventional polysilicon technology. A typical example device using integrated drive circuits is described in the paper entitled "Fully Integrated Poly-Si TFT CMOS Drivers for Self-Scanned Light Valve" by Y. Nishihara et al in SID 92 Digest, pages 609-612.

More recently, it has been proposed that additional circuit functions can similarly be integrated on the active substrate, for example, circuitry for voltage level generation, memory and video signal processing functions, which hitherto have been implemented in circuitry provided separately from the active substrate. An example of an AMLCD with additional, integrated, auxiliary circuit functions is described in the paper entitled "A Highly Integrated AMLCD for Mobile Phone Applications" by M. J. Edwards et al, Digest of Technical Papers in AM-LCD 01 (2001 International Workshop on Active—Matrix Liquid—Crystal Displays, Japan), pages 53-54. In this, dynamic memory circuits are incorporated in the pixels and additional circuitry, comprising charge pump circuits for generating voltage levels required in operation, a control logic circuit for controlling the operation of the row and column drive circuits, and a common electrode drive circuit, are integrated on the active substrate at its periphery outside the pixel array area, and fabricated using thin film processing technology. Such a device requires only a minimum of external connections, to provide low voltage digital video data signals and a low voltage power supply of around 3.3 volts.

The additional circuitry integrated on the active plate may be expected, however, to lead to problems associated especially with electromagnetic interference and noise effects, particularly as the complexity, functionality and performance of the circuits increases. These may be problems caused by the radiation of electrical noise from the circuits which become more apparent as circuit operating frequencies increase, for example, as a consequence of increasing the size and/or resolution of the display device. On the other hand, problems may be experienced due to the sensitivity of these circuits to external sources of electrical interference, particularly if the circuits are operating with relatively low voltage signal levels.

According to the present invention, there is provided a matrix display device as described in the opening paragraph wherein the second substrate extends over at least part of the auxiliary circuitry on the first substrate and carries an electrically conductive shielding layer for electrically shielding at least a region of the auxiliary circuitry.

Thus, electrical shielding serving to prevent, or at least reduce, a problem with electrical interference caused by, or in, the auxiliary circuitry during operation of the device is provided in a relatively simple and convenient manner and requiring minimal additional components and processing.

The auxiliary circuitry preferably includes drive circuits for driving the display pixels, i.e. a row (scanning) drive circuit and a column (data) drive circuit.

Where the display device has an electrode layer on the second substrate overlying the pixel electrode array, for example, a common electrode for the display pixels in an active matrix liquid crystal display device, (which may be a continuous electrode extending over the entire display area defined by the pixel array or, alternatively, of a sub-divided form covering respective different regions of the array), the conductive layer provided on the second substrate for this purpose, and typically comprising a transparent conductive material such as ITO, may advantageously be utilised to provide the conductive shielding layer. Accordingly, the shielding layer is provided without any additional components or deposited layers being necessary, thereby simplifying manufacture.

Preferably, where the second substrate is of the kind that carries a black matrix, light shielding, layer and this layer comprises material which is electrically conductive, for example a metal such as chromium, then this material may similarly be used to provide the electrically shielding layer, either alone or possibly together with the common electrode layer material, preferably as overlying layers. Enhanced shielding can then be achieved by virtue of this metal having a lower sheet resistance compared with ITO.

The electrically shielding layer is preferably separated electrically from the common electrode layer and/or the black matrix layer extending over the pixel array. This separation enables the potentials applied to the different regions in use to be independently controlled.

In a particularly preferred embodiment, where the auxiliary circuitry comprises a plurality different circuits performing respective functions and occupying respective, discrete, regions of the first substrate, for example, row and column drive circuits positioned adjacent respective, different, edges of the display area and further associated circuits at other areas, the electrically shielding layer comprises discrete, physically separate, portions, each of which portions overlies, either completely or partially, a respective one or more of the different circuits. This division would assist in avoiding interference between the different circuits. The shielding layer covering the different circuits could be provided as a single, continuous, conductive layer but in this case it would not be possible to control independently the potentials applied to the layer portions overlying individual associated circuits and the risk of interference occurring between different circuits would be increased.

Although the invention is applicable especially to matrix liquid crystal display devices, and particularly active matrix liquid crystal display devices (AMLCDs), it is envisaged that it could be applied to advantage in display devices using other kinds of electro-optic materials and similarly using two, spaced, substrates.

In the case of an AMLCD or similar having a seal between the two substrates extending around at least the display area for containing electro-optic material, the auxiliary circuitry may be situated outside or inside the seal line. In the former case, a further one or more seals may be provided between the substrates and extending around the, or respective parts of, the auxiliary circuitry for protecting the circuitry. Alternatively, parts of the auxiliary circuitry, for example row and column drive circuits, may be situated within the seal line while other parts are situated outside the seal line, again with those parts outside the seal line preferably being protected by one or more additional seals.

An embodiment of matrix display device, in particular an AMLCD, in accordance with the present invention will now be described, by way of example, with reference to the accompanying drawings, in which.

It will be appreciated that the figures are mere schematic and are not drawn to scale.

The AMLCD is of a conventional kind as regards its general construction and operation and accordingly it is not considered necessary to describe here these aspects in detail. Referring to the figures, the device comprises a matrix array of individual display pixels 10, the circuit configuration of a typical one of which is shown enlarged in FIG. 1. Each pixel comprises a pixel electrode 14 and an associated switching device 16, here in the form of a thin film transistor (TFT). The pixel electrode 14 is connected to the drain of the TFT while the gate and source of the TFT are connected to respective ones of sets of row and column address conductors 17 and 18 shared by the pixels in the array.

Figure 2:
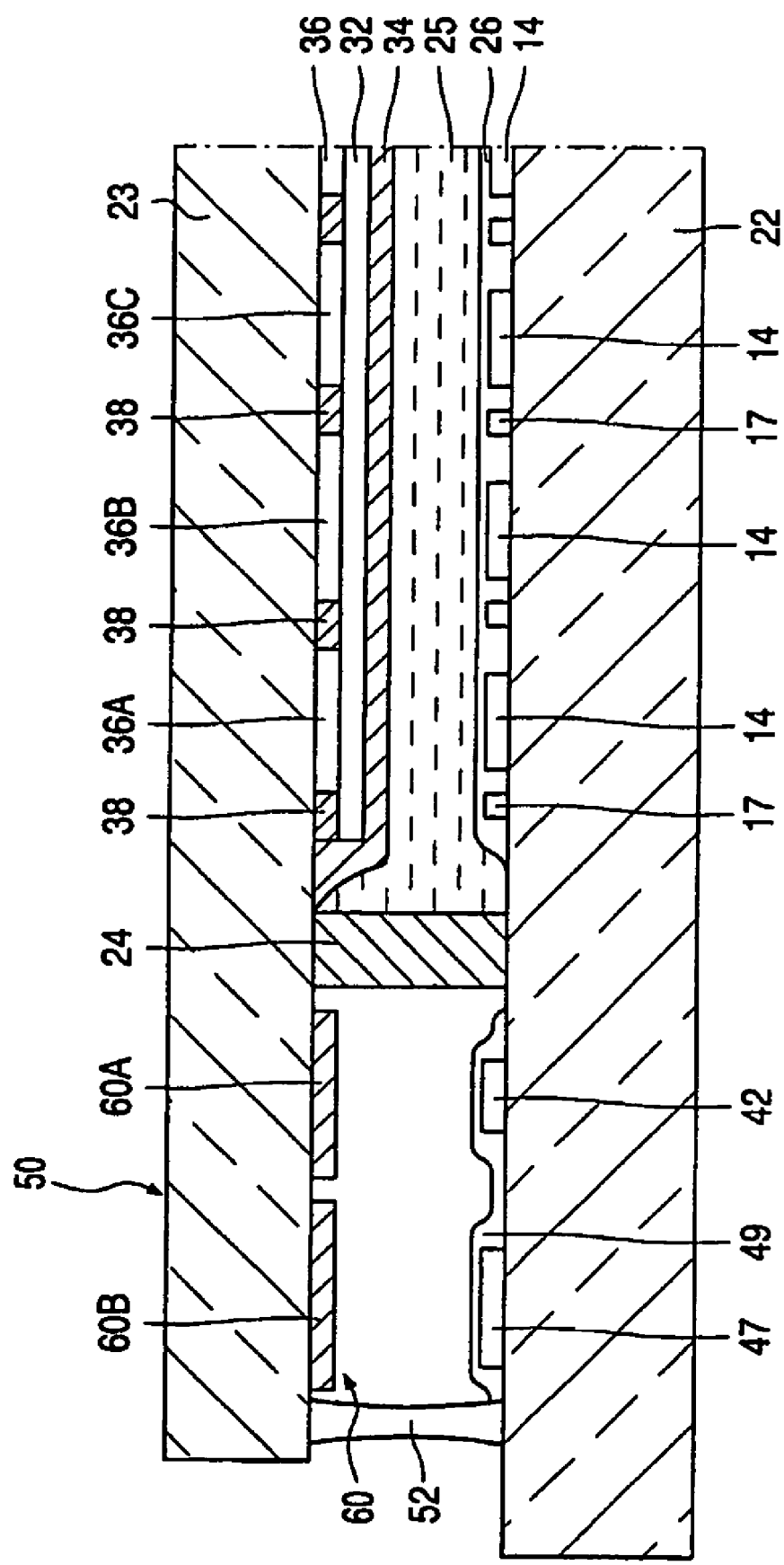
FIG. 2 is a schematic cross-sectional view along the line II-II of FIG. 1.

The display pixels 10, organised in rows and columns, occupy a pixel array area between two overlying substrates 22 and 23 and defining a corresponding display area 20. Referring also to FIG. 2, the two substrates 22 and 23 are spaced apart and sealed together around the periphery of the display area 20 by a seal 24 to contain a layer of twisted nematic liquid crystal (LC) material 25 therebetween. The seal line corresponds approximately with the edge of the common electrode 32. Both substrates are of glass although other insulating materials, including flexible polymer materials or materials with an insulating surface, may be used, and, in the case of a reflective rather than transmissive type of display, only one needs to be optically transparent to transmit light in operation.

The substrate 22, referred to as the active substrate, carries the active matrix circuitry of the display array, which circuitry comprises the sets of row and column address conductors 17, 18 and the TFTs 16, and also the pixel electrodes 14. The active matrix circuitry and pixel electrodes are formed on the inner surface of the substrate 22 in conventional manner using large area, thin film, processing techniques involving the deposition and patterning of various conducting, insulating, and semiconducting layers deposited over the substrate, for example by a CVD process, and using photolithographic definition techniques, as is well known in the art. The TFTs 16 used here are preferably of the polysilicon type with either top or bottom gate structure. An LC orienting film 26 is provided over the active matrix pixel array in normal fashion.

The other substrate 23, referred to as the passive substrate, carries on its inner surface adjacent to the liquid crystal layer 25 a transparent, electrically conducting, layer 32, for example of ITO, which extends continuously over the display area 20, corresponding to the array of the array of pixel electrodes 14, and serves as a common electrode constituting opposing electrodes of the display pixels in the array. Each display pixel thus comprises a first electrode 14, a second electrode constituted by the overlying portion of common electrode layer 32, and the intervening liquid crystal layer 25. A further LC orienting film 34 is provided completely over the ITO electrode 32. The common electrode 32 may instead be divided into a plurality (two or more) of electrically—separated portions, each portion covering a respective part of the display area, where it is desired to use a particular kind of drive scheme which requires different potentials to be applied to the pixel second electrodes in different regions of the array at different times.

The display device comprises a colour display device. In such devices, it is usual for the passive substrate also to carry an array of red, green and blue colour filter elements aligned with the pixels such that each pixel is assigned a respective colour output. Alternatively, however, a colour filter array could be provided on the active substrate 22 instead. As will be apparent to skilled persons, a variety of different colour filter element types and structures can be used. Typically, and as shown in FIG. 2, the colour filter structure consists of a filter layer 36 consisting of red, green and blue portions, as shown at 36A, 36B and 36C, each of which overlies a respective pixel electrode 14, and black matrix in the form of lines of light opaque material extending in the row and column directions and defining a grid pattern 38 surrounding the individual colour filter portions.

In operation of the device, the pixels 10 are driven in a conventional manner with each row in the array being addressed in sequence, one at a time in respective row address periods, by means of a scanning (gating) signal applied to each row conductor 17 in turn to turn on the TFTs 16 of the pixels in the selected row which allows the pixels to be loaded with respective data signals, derived from an input video signal and applied to the column conductors 18 in synchronisation with the scanning signals, which determine the display outputs of the individual pixels. Upon a row of pixels being selected, the electrode 14 of each pixel 10 in the row is thus charged to a level according to the applied data signal thereby producing a desired display output. Following the addressing of all the rows of pixels in this manner in one frame period to provide a display image output, the rows are repeatedly addressed again in similar manner in successive frame periods.

The scanning and data signals are applied to the sets of row and column address conductors 17 and 18 respectively by row and column driver circuits 40 and 42 carried on the substrate 22 and forming part of auxiliary circuitry. These circuits are of conventional type and integrated on the inner surface of the substrate 22 at the periphery of the substrate 22 outside the pixel display area 20. They comprise thin film circuit elements, such as TFTs, capacitors and interconnections, fabricated simultaneously with the active matrix circuitry on the substrate 22 from the same deposited thin film conducting, insulating and semiconducting layers used for the active matrix circuitry and sharing the same processing technology. The integration of the drive circuits is becoming increasingly common in AMLCDs employing polysilicon TFT technology as it avoids the need to mount prefabricated drive circuits in crystalline silicon IC form either on the substrate 22 or on a separate support with interconnections to the substrate 22.

Figure 1:
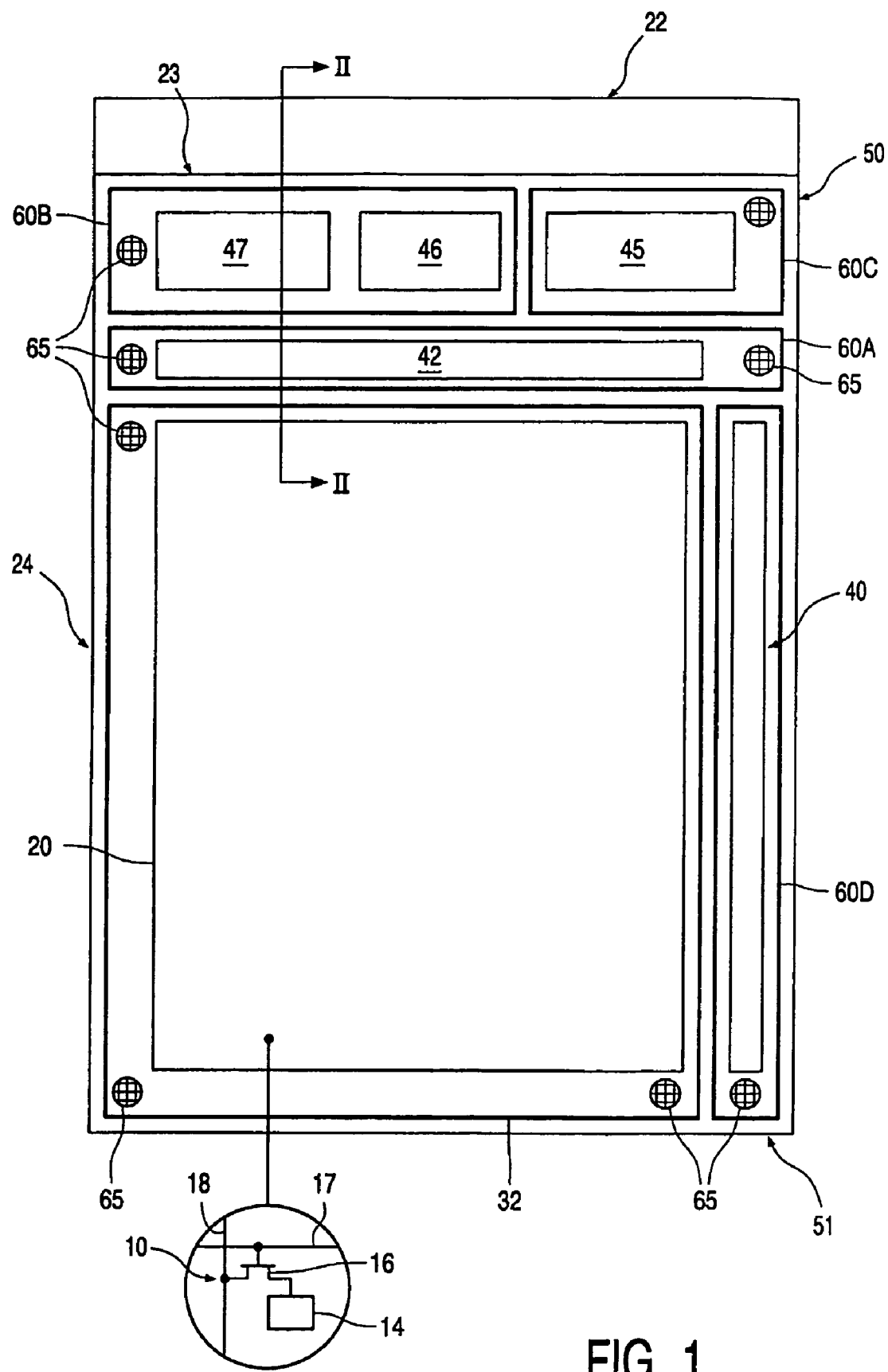
FIG. 1 is a plan schematic view of the display device.

As shown in FIG. 1, the row and column drive circuits 40 and 42 are formed on respective, discrete, regions of the substrate 22 extending along two adjacent sides of the pixel array 20 and outside the seal 24. The row and column address conductors 17 and 18 extend from the pixel display area to the regions occupied by these drive circuits where they are connected to respective outputs of the drive circuits. In the figures the driver circuits are schematically represented in block form for simplicity.

Various electronic circuit functions in addition to the row and column drive circuit functions and forming part of the auxiliary circuitry can also be integrated on the substrate 22 outside the display/pixel array area 20 in similar manner, as in the device described in the aforementioned paper by M. J. Edwards et al. In this particular embodiment of display device, additional circuit functions included on the active substrate 22 comprise a signal processing circuit 45, for performing corrections and adjustments to an incoming video signal prior to its supply to the column drive circuit 42, a control logic circuit 46 for deriving timing information from the incoming video signal and controlling the operation of the row and column drive circuits 40 and 42 in accordance therewith, and a memory circuit 47, which may be employed for a variety of purposes requiring the storage of pixel data, for example, for holding a display image, or as a field store for use in conjunction with the signal processing circuit 45 in performing video data signal adjustments. Each of these further circuits integrated on the substrate 22, and again represented in block form in the figures for simplicity, occupies a respective discrete area on the substrate 22 outside the pixel array area towards the periphery of the substrate 22. A layer of passivating material 49 (FIG. 2) is deposited over the circuits to encapsulate and protect them. Further protection is afforded by an additional seal 52 extending between the substrates 22 and 23 and around the auxiliary circuitry to enclose and hermetically seal the space between the substrates in which the auxiliary circuitry is contained. Separate additional seals may be used for respective parts of the circuitry in this way.

It will be appreciated that the auxiliary electronic integrated circuitry could include other circuit functions in addition to, or instead of, those particular circuits mentioned (for example as described in the aforementioned paper) depending on the individual display device requirements. Generally, the auxiliary circuitry would include at least the row and column drive circuits 40 and 42. Interconnections between the different circuits of the auxiliary circuitry and the pixel array, and external inputs have not been shown in the figures for the sake of clarity.

The auxiliary circuitry may comprise circuits other than the example circuits described above, and may be circuits which are not necessarily directly associated with the driving of the display pixels. For example, sensing circuits may be integrated on the substrate 23 for sensing touch inputs or the like to the device.

The increased functionality provided in this way requires relatively complex circuitry, and, particularly with improvements in the performance of display devices with such circuitry, for example as a result of increasing the number of pixels in the array to produce larger or high resolution displays, problems associated with electromagnetic interference effects can become apparent. These problems may be due to the effects of electromagnetic radiation, or noise, emanating from the circuits as their operating frequencies are increased. Typically, frequencies in the order of several MHZ may be present in operation of the device. Conversely, the circuits themselves may be highly sensitive and susceptible to electrical interference from external sources. Such effects may be especially apparent if the circuits are operating with relatively low level signals or if only minor variations in signal levels are acceptable.

In order to reduce the aforementioned electrical interference related problems, at least to an extent, the display device is provided with electrical shielding carried on the passive substrate 23 and extending over at least part of the auxiliary circuitry constituted by the individual circuits integrated on the active plate 22. To this end, the size substrate 23 is increased so as to extend beyond the pixel array area with parts thereof overlying at least those additional circuits which it is desired to shield. In the case of the embodiment illustrated in FIGS. 1 and 2, the substrate 23 is extended so as to cover all the circuits 40, 42, 45, 67 and 47, with the circuits 42 and 45 to 47 being covered by an end region 50 of the substrate 23 and the circuit 40 being covered by a side region 51. The size of the substrate 23 in the latter dimension substantially corresponds to that of the substrate 22. The electrical shielding is provided in the form of an electrically conductive layer carried on the inner surface of the substrate 23 and overlying the additional circuits. This layer may be a separate, independently deposited, layer provided on the substrate 23 specifically for this purpose, in which case the material of the layer may be selected from a variety of different conductive materials capable of being deposited and patterned in appropriate manner. Preferably, however, the shielding layer is formed from one, or more, of the deposited conductive layers used to form the structure on the substrate 23 at the pixel array area. This greatly simplifies fabrication as no additional deposition and patterning processes need be involved. Instead, the regions of the deposited layer required for electrical shielding can be defined at the same time as the deposited layer is patterned to provide the require structure at the pixel array area by employing, in the case of a standard photolithographic processing technique involving resist patterning and etching operations being used for this purpose, an appropriately designed patterning mask.

In the embodiment shown, the ITO layer deposited on the substrate 23 and used to form the common electrode(s) 32 of the pixel array is conveniently utilised for the shielding layer, as shown at 60 in FIG. 2. The ITO layer deposited over the substrate 23 is patterned such that the shielding layer 60 and common electrode 32 defined thereby are electrical separate so as to avoid any interaction between signals in the pixel array and the operation of the integrated circuits. Moreover, in this embodiment the shielding layer 60 is divided into discrete regions each of which overlies a respective one or more of the additional circuits. Referring to FIG. 1, then the shielding layer is split into four separate portions 60A, 60B, 60C and 60D covering, respectively, the column drive circuit 42, the memory and control logic circuits 47 and 46, the signal processing circuit 45, and the row drive circuit 40, and each serving to shield individually its respective associated circuits. The common electrode 32 serves as a shield for the pixel array area.

The material used to provide the black matrix 38 in the structure on the substrate 23 here comprises a metal such as chromium. The layer deposited for this purpose may be used also to form the shielding layer rather than the ITO layer. Alternatively, both layers could be used such that the shielding layer then has a composite layer structure.

In use of the device, the electrical shielding portions 60A-D are each held at a predetermined potential so as to act appropriately as electrical screening. Typically, this may correspond to ground, although other potential levels may be used. The potential level need not be constant but could vary, for example where potential levels in the underlying circuit change in a fixed pattern. Even if the same predetermined potential, e.g. ground, is applied to all portions, it is desirable for the electrical shielding to be divided into separate portions rather than employ a continuous layer overlying all the additional circuits so as to avoid, or reduce, the possibility of interactions between different circuits, for example with digital switching signals in the memory circuit 47 affecting analogue signals in the signal processing circuit 45. Such division can also assist in reducing power consumption.

In order to apply the appropriate potentials to the electrical shielding portions 60A-D, electrical connections are provided between the active substrate 22 and these portions on the substrate 23, as indicated at 65 in FIG. 1. More than one connection may be present for each portion. A similar connection(s) is provided also for the common electrode 32. These connections may, for example, comprise electrically conducting pillars of slightly compressible material formed on the active substrate 22 and over conductive tracks carried on the substrate 22 which are supplied with the appropriate potential levels by the integrated power generating circuit, and positioned such that when the two substrates 22 and 23 are assembled and sealed together, the pillars contact their respective shielding portions and the common electrode 32. Other means of establishing electrical connections between the substrate 22 and these areas on the substrate 23 can, however, be employed, as will be apparent to skilled persons.

As in conventional AMLCDs, the two substrates 22 and 23 are spaced closely together, typically with around five micrometers separation, and consequently the electrical shielding layer portions are in close proximity to their respective circuits and provide highly effective screening for electromagnetic interference effects, thereby preventing the radiation to the outside of the device of electrical noise generated by the circuits due especially to the high frequency signals present when operating, or to prevent external electrical noise sources affecting their operation where these circuits may otherwise be sensitive to such noise, for example by virtue of being designed to operate with relatively low level signals. The close spacing of the two substrates means that although the sides of the spaces defined by the overlying parts of the substrates at their edges may be left unshielded, very little or no electrical noise is likely either to reach the integrated circuits from outside or to escape to the outside through these sides.

In the example described, the seal 24 containing the LC material between the substrates 22 and 23 extends around the area of the pixel array and the auxiliary circuitry is located outside the seal line. However, other arrangements of seals are possible. Thus, the seal line may instead be arranged to surround certain of the associated integrated circuits, for example the row driver circuit 40 and/or the column driver circuit 42, so that these circuits are effectively within the LC cell defined by the seal line and the substrates. The seal line may alternatively be arranged close to the edge of the substrate 23 along all sides so as to enclose all the auxiliary circuitry. In this case, the additional seal or seals 52 are unnecessary.

Although the invention has been described in relation to an AMLCD, it is envisaged that it can be applied to other kinds of display devices similarly comprising two spaced substrates with electro-optical material, for example, an electrochromic or electrophoretic material disposed between the substrates and having auxiliary circuits carried on one of the substrates.

From reading the present disclosure, other modifications will be apparent to persons skilled in the art. Such modifications may involve other features which are already known in the field of active matrix display devices and component parts therefor and which may be used instead of or in addition to features already described herein.

The invention claimed is:

1. A matrix display device comprising electro-optic material disposed between first and second spaced substrates, the first substrate carrying a pixel circuit comprising an array of pixel electrodes defining display pixels in a display area and auxiliary electronic circuitry at a region of the first substrate outside the display area, wherein the second substrate extends over at least part of the auxiliary electronic circuitry and the display area on the first substrate and carries an electrically conductive shielding layer for electrically shielding at least a region of said auxiliary electronic circuitry, wherein said electrically conductive shielding layer is divided into a plurality of electrically separate areas covering respective parts of said auxiliary electronic circuitry.

2. The matrix display device of claim 1, wherein the electrically conductive shielding layer comprises part of an electrically conducting layer deposited on the second substrate and forming part of the structure of the display pixels in the display area.

3. The matrix display device of claim 2, wherein the parts of the electrically conducting layer on the second substrate constituting the electrically conductive shielding layer and the display pixel structure are electrically separated from one another.

4. The matrix display device of claim 2, wherein said electrically conducting layer deposited on the second substrate forms one or more display pixel electrodes opposing the display pixel electrodes carried on the first substrate.

5. The matrix display device of claim 2, wherein said electrically conducting layer deposited on the second substrate forms light shields extending between display pixels.

6. The matrix display device of claim 1, wherein electrical potentials are supplied to each of the separate areas of the shielding layer from the first substrate via respective electrical connection elements extending between the first and second substrates.

7. The matrix display device of claim 1, wherein the auxiliary electronic circuitry is integrated circuitry comprising thin film circuit elements fabricated on the first substrate.

8. The matrix display device of claim 1, wherein the auxiliary electronic circuitry comprises at least row and column drive circuits for driving the display pixel array.

9. The matrix display device of claim 1, wherein a seal is provided between the first and second substrates extending around at least the display area to contain the electro-optic material, and wherein at least part of the auxiliary electronic circuitry lies outside the seal line.

10. The matrix display device of claim 9, wherein the seal is a first seal, the device comprising a second seal provided between The first and second substrates extending around the least part of The auxiliary electronic circuitry tat lies outside the first seal.

11. The matrix display device of claim 1, wherein the device comprises an active matrix liquid crystal display device.

12. The matrix display device of claim 1, wherein said auxiliary electronic circuitry comprises a video signal processing circuit and said video signal processing circuit performs corrections and adjustments to an incoming video signal prior to said incoming video signal being provided to a column drive circuit.

13. The matrix display device of claim 1, wherein said auxiliary electronic circuitry further comprises a video control logic circuit that derives timing information from the incoming video signal and provides control signals for operating row and column drive circuits on said matrix display device.

14. The matrix display device of claim 1, wherein said auxiliary electronic circuitry comprises a memory circuit that is for storing pixel data.

15. The matrix display device of claim 1, comprising a passivation layer deposited over a portion of the auxiliary electronic circuitry.

16. The matrix display device of claim 1, wherein the auxiliary electronic circuitry includes circuitry for sensing a touch input.

17. A matrix display device comprising:
electro-optic material disposed between a first substrate and a second substrate;
a plurality of pixel electrodes on a first side of said first substrate, said first side of said first substrate facing said second substrate, said plurality of pixel electrodes define display pixels in a display area;
a video signal processing circuit in a region, on said first side of said first substrate, separate from said display area;
said second substrate extends over at least part of said video signal processing circuit and the display area; and
an electrically conductive shielding layer on a side of said second substrate for electrically shielding at least a region of said video signal processing circuit, wherein said electrically conductive shielding layer is divided into a plurality of electrically separate areas covering respective parts of said region of said video signal processing circuit.

18. A matrix display device comprising:
electro-optic material disposed between a first substrate and a second substrate;
a plurality of pixel electrodes disposed on a first side of said first substrate, said first side of said first substrate facing said second substrate, said plurality of pixel electrodes define display pixels in a display area;
a specialty circuit being one of a video signal processing circuit, a video control logic circuit, and a memory circuit disposed in a region, on said first side of said first substrate, separate from said display area;
said second substrate extends over at least part of said specialty circuit and the display area; and
an electrically conductive shielding layer on a side of said second substrate for electrically shielding at least a region of said specialty circuit, wherein said electrically conductive shielding layer is divided into a plurality of electrically separate areas covering respective parts of said region of said specialty circuit.

19. The matrix display device of claim 18, wherein said specialty circuit receives an analog signal.

20. A matrix display device comprising:
electro-optic material disposed between a first substrate and a second substrate;
a plurality of pixel electrodes on a first side of said first substrate, said first side of said first substrate facing said second substrate, said plurality of pixel electrodes define display pixels in a display area;
a signal processing circuit comprising analog circuitry for performing corrections and adjustments to an incoming video signal and for deriving timing information from the incoming video signal, said signal processing circuit positioned in a region on said first side of said first substrate that is outside of said display area;
said second substrate extends over at least part of said analog circuitry and the display area; and
an electrically conductive shielding layer, on a side of said second substrate that faces said analog circuitry, for electrically shielding at least a region of said analog circuitry, wherein said electrically conductive shielding layer is divided into aplurality of electrically separate areas covering respective parts of said signal processing circuit.

* * * * *